United States Patent
Truong et al.

(10) Patent No.: US 9,696,761 B1
(45) Date of Patent: Jul. 4, 2017

(54) MODULAR COMPUTING DEVICE DISPLAY MODULE

(71) Applicant: Lenovo (Singapore) Pte. Ltd., Singapore (SG)

(72) Inventors: Cuong Huy Truong, Cary, NC (US); David Wayne Hill, Cary, NC (US); Cyan Godfrey, Chapel Hill, NC (US); Ali Kathryn Ent, Raleigh, NC (US); Matthew Ian Tucker, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/019,778

(22) Filed: Feb. 9, 2016

(51) Int. Cl.
*G06F 1/16* (2006.01)

(52) U.S. Cl.
CPC .......... *G06F 1/1654* (2013.01); *G06F 1/1607* (2013.01); *G06F 1/1675* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,479,263 A * | 10/1984 | Rosenfeldt | ............... | H05K 7/14 312/7.1 |
| 5,257,163 A * | 10/1993 | Buist | ......................... | G06F 1/18 361/679.22 |
| 5,604,662 A * | 2/1997 | Anderson | ............... | G06F 1/184 312/204 |
| 5,801,921 A * | 9/1998 | Miller | ..................... | G06F 1/183 174/72 A |
| 5,940,274 A * | 8/1999 | Sato | ........................ | G06F 1/181 312/223.2 |
| 5,949,644 A * | 9/1999 | Park | ........................ | G06F 3/033 361/679.32 |
| 6,118,663 A * | 9/2000 | Fan | ........................ | G06F 1/1616 312/223.1 |
| 6,128,186 A * | 10/2000 | Feierbach | ............. | G06F 1/1613 312/223.3 |
| 6,175,490 B1 * | 1/2001 | Papa | ..................... | G06F 13/409 312/223.2 |
| 6,185,092 B1 * | 2/2001 | Landrum | .................. | G06F 1/16 312/223.1 |
| 6,219,229 B1 * | 4/2001 | Lee | .......................... | G06F 1/18 361/679.08 |
| 6,366,452 B1 * | 4/2002 | Wang | ..................... | F16M 11/10 248/125.1 |

(Continued)

*Primary Examiner* — Lisa Lea Edmonds
(74) *Attorney, Agent, or Firm* — Ference & Associates LLC

(57) ABSTRACT

One embodiment provides a system, including: a module housing comprising a top, a bottom, and at least one lateral edge comprising a top side, a bottom side, and at least one lateral side; at least one display device element disposed at a lateral side of the module housing; and at least one display device operatively coupled to the at least one display device element; wherein the module housing is connectable to another module housing using at least one latch mechanism; wherein at least a portion of the latch mechanism is disposed at the bottom side of the module housing; and wherein at least another portion of the latch mechanism is disposed at the top side of the module housing. Other aspects are described and claimed.

20 Claims, 12 Drawing Sheets

(56) References Cited

U.S. PATENT DOCUMENTS

| | | | | |
|---|---|---|---|---|
| 6,583,989 B1* | 6/2003 | Guyer | ............... | G06F 1/18 312/223.1 |
| 6,661,648 B2* | 12/2003 | Dayley | ............ | G06F 1/181 361/679.22 |
| 7,170,557 B2* | 1/2007 | Manico | ............ | G06F 1/1601 348/333.06 |
| 7,503,011 B2* | 3/2009 | Wilkinson | ......... | G06F 1/1601 715/765 |

* cited by examiner

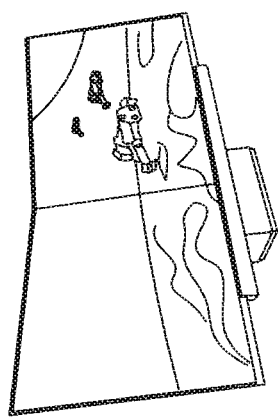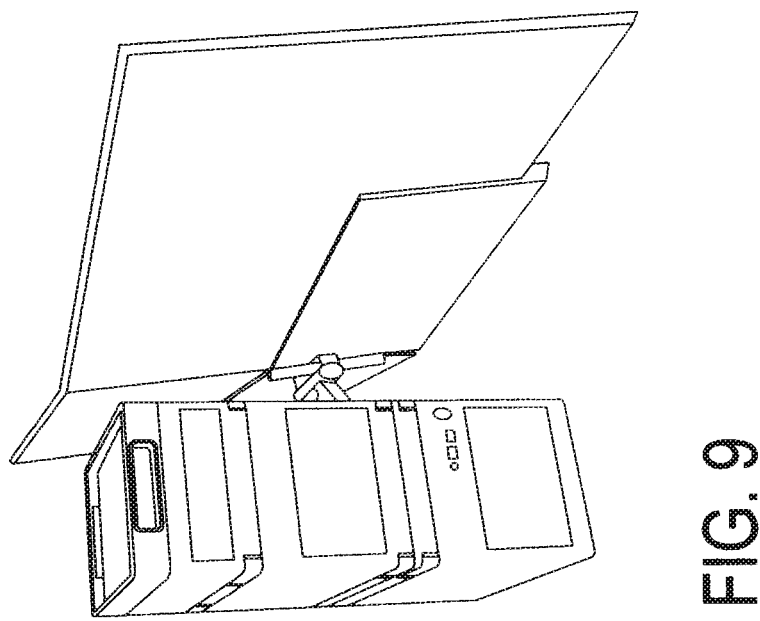
FIG. 9

MODULAR COMPUTING DEVICE DISPLAY MODULE

BACKGROUND

Users use information handling devices (e.g., tablets, personal computers, laptop computers, smart watches, etc.) as methods for performing many tasks, for example, playing games, generating documents, accessing online services, and the like. Many companies employ the use of personal computers (e.g., desktop computers, tower computers, workstation computers, and the like) for employees due to the fact that these types of computers generally provide more processing power, speed, and digital storage space.

However, the bulky nature of existing personal computers have caused some employers to turn to smaller, portable information handling devices (e.g., tablets, laptop computers, etc.). However, unlike the personal computer, the smaller, portable information handling devices do not allow a user to easily expand the capabilities of the device. The large size and expansion slots of the personal computer allow users to expand the functions and features of the personal computer. For example, a user needing a more powerful graphics card can replace the graphics card in a personal computer, which is not easily accomplished with a smaller, portable information handling device. As another example, if a user needs more storage space, a user can add another hard disk drive or replace the current hard disk drive with a larger hard disk drive. Replacing a hard disk drive on a smaller, portable information handling device is not only very time consuming and difficult, but also, in some cases, impossible.

BRIEF SUMMARY

In summary, one aspect provides a system, comprising: a module housing comprising a top, a bottom, and at least one lateral edge comprising a top side, a bottom side, and at least one lateral side; at least one display device element disposed at a lateral side of the module housing; and at least one display device operatively coupled to the at least one display device element; wherein the module housing is connectable to another module housing using at least one latch mechanism; wherein at least a portion of the latch mechanism is disposed at the bottom side of the module housing; and wherein at least another portion of the latch mechanism is disposed at the top side of the module housing.

Another aspect provides a device, comprising: a module housing comprising a top, a bottom, and at least one lateral edge comprising a top side, a bottom side, and at least one lateral side; and at least one peripheral device element disposed at a lateral side of the module housing; wherein the module housing is connectable to another module housing using at least one latch mechanism; wherein at least a portion of the latch mechanism is disposed at the bottom side of the module housing; and wherein at least another portion of the latch mechanism is disposed at the top side of the module housing.

A further aspect provides a system, comprising: a base module housing comprising a top, a bottom, and at least one lateral edge comprising a top side and a bottom side, the base module housing comprising: at least a portion of at least one latch mechanism disposed at the top side of the base module housing; a display device module housing comprising a top, a bottom, and at least one lateral edge comprising a top side, a bottom side, and at least one lateral side, the display device module comprising: at least a portion of at least one latch mechanism disposed at the top side of the display device module housing; at least a portion of at least one latch mechanism disposed at the bottom side of the display device module housing; and at least one display device element disposed at a lateral side of the display device module housing; a cap module housing comprising a top, a bottom, and at least one lateral edge comprising a top side and a bottom side, the cap module housing comprising: at least a portion of at least one latch mechanism disposed at the bottom side of the cap module housing; wherein the base module housing, display device module housing, and cap module housing are vertically connectable using the latch mechanisms.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 9 illustrates an example modular computing device with a display device module and dual displays.

DETAILED DESCRIPTION

Figure 1:
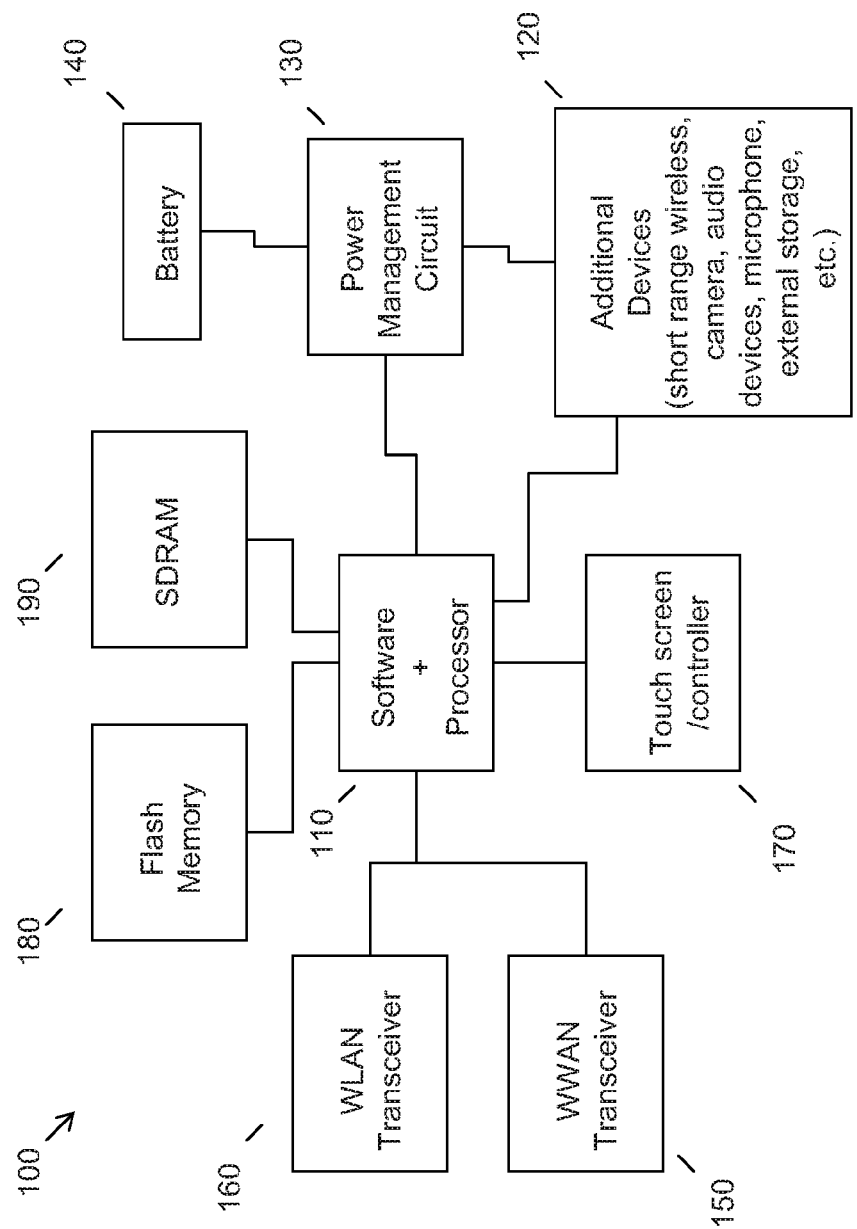
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Existing personal computers chassis sizes are fixed, meaning the computer will take up the same amount of space even if the user does not need or use all the space afforded by the chassis. The computers are often large and have a significant amount of empty space inside the computer tower. Computer manufacturers provide the extra space to allow for many different configurations. For example, some users may want or need multiple removable media drives (e.g., digital video disc (DVD) drives, compact disc (CD) drives, 3.5" disc drives, etc.). Other users may need multiple hard disc drives. As such, the computers are manufactured in a way that allows the end user to configure and expand the computer as needed or desired by the user. However, for the users that do not need additional components the extra space within the chassis is wasted and also results in a computer workstation having a larger unnecessary footprint. Due to the larger footprint computers are typically placed on the floor or in a corner on a desk. This causes the connection ports, usually located on the back of the computer tower, to be difficult to access. Due to the distance between the tower and peripherals, the cabling can become messy.

Smaller personal computers and portable information handling devices (e.g., tablets, smart phones, laptop computers, etc.) have a smaller footprint. However, these devices do not allow an end-user as many options regarding the configuration of the device. For example, a user may not be able to add additional storage space. Also, some components cannot be changed at all and the device has to be purchased with the desired component. For example, the graphics card within a laptop cannot be changed with a more powerful graphics card. Additionally, because the device components cannot be changed, the device cannot be upgraded or updated as components become obsolete. Since the components cannot be easily swapped, once the device is purchased, the user is essentially stuck with the configuration as purchased. Additionally, while the connection ports are easier to access, these smaller devices generally do not have as many connection ports as the larger counterpart. The reduction in connection ports results in a user not having as many options or spaces for connecting peripheral devices.

These technical issues present problems for users when purchasing personal computers or other information handling devices. A user who wants the ability to configure and change the computer has to purchase a large personal computer, which has a large footprint, even if the user does not need all the empty space within the personal computer chassis. Additionally, due in part to the large footprint, the personal computer is usually placed in a location which causes the connection ports to become less accessible. Thus, the user has to contend with a large bulky computer in order to ensure the ability to configure and upgrade the computer as desired.

Accordingly, an embodiment provides a modular computing device that allows a user to configure the computer as desired. An embodiment comprises a base computing device module having a processor and memory. In one embodiment, the base module may include components typically found in a standard computer workstation. For example, the base module may include a motherboard, processor, memory, hard drive, and other components normally included in a personal computer. The base module may also include a connector for facilitating electrical connections. For example, in one embodiment the base module includes an electrical connector (e.g., universal serial bus (USB) connector, serial port connector, blade connector, peripheral component interconnect (PCI) connector, etc.) located on the top side of the module.

An embodiment may also include a cap module. When coupled to the top of a second module (e.g., the base module, another module, etc.), the cap module may act as a lid for the modular computing device. The cap module may also include a receiver for the connector of the second module. For example, when attached to the base module, the cap module may include a recess to accept the connector of the base module. In one embodiment, the cap module may include feet located on the bottom side of the module. For example, the cap module may have some protrusions on the bottom. When the cap module is removed from the module computing device, the protrusions may act as feet to help protect components, connectors, and the like, located on the bottom of the module from being scratched, bent, becoming dirty, and the like. When the cap module is being placed on top of the modular computing device, these protrusions may act as an alignment mechanism. For example, the base module may include recesses located on the top of the module. The protrusions on the cap module may be paired with these recesses to ensure alignment of the cap and base module, which may ensure alignment of any connectors or connections made between the cap and second module. An embodiment may include additional modules that can be stacked within the vertical modular computing device. Example additional modules include a graphics module, storage module, battery module, peripheral device module, display device module, and the like.

Each of the modules may lock into a module below using a latch mechanism. In one embodiment, a portion of the latch mechanism may be included on one module and the other portion of the latch mechanism may be included on a second module. For example, the base module may include a portion of the latch mechanism located at the top of the module. The cap module may include a portion of the latch mechanism located at the bottom of the module. Additional modules may include a portion of one latch mechanism located at the top of the module and a portion of a second latch mechanism located at the bottom of the module. The latch mechanism may work to couple the modules together to act as a unitary piece. For example, a user could pick the coupled modules up using handles included on the cap module and all of the modules would remain coupled together as the user is moving the system using the handles. Thus, the system and devices, as described in more detail below, allow a user the ability to configure a computer as much or as little as possible without needing a large footprint to accommodate the computer. Additionally, the systems and devices allow a user to configure the computer as needed. For example, if the user wants one configuration one day and another the next day, the user can easily remove or add modules as desired.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
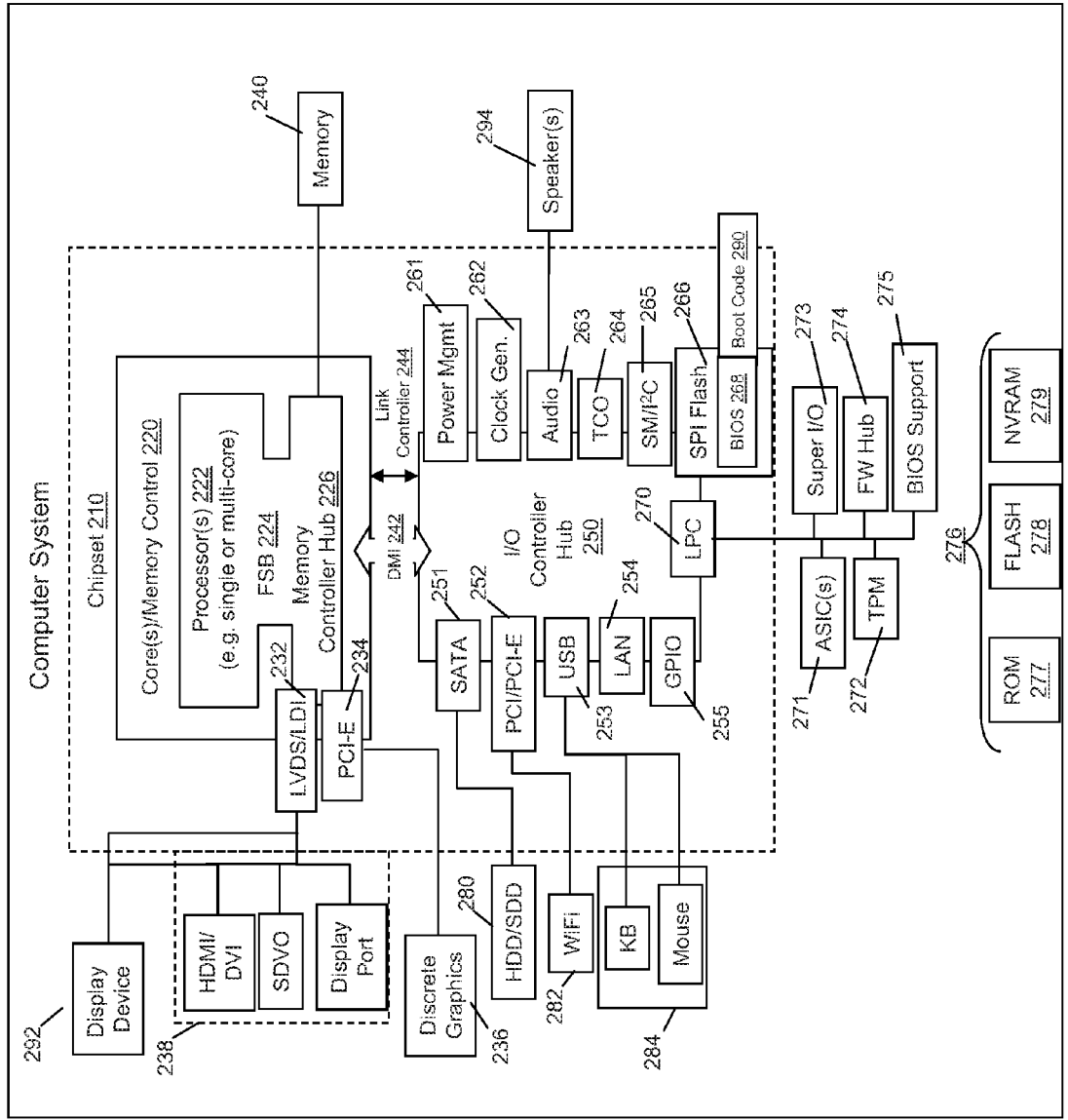
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices and may be included within the systems and devices described herein. For example, the circuitry outlined in FIG. 1 may be implemented in a tablet or smart phone embodiment, whereas the circuitry outlined in FIG. 2 may be implemented in a personal computer embodiment.

Figure 3:
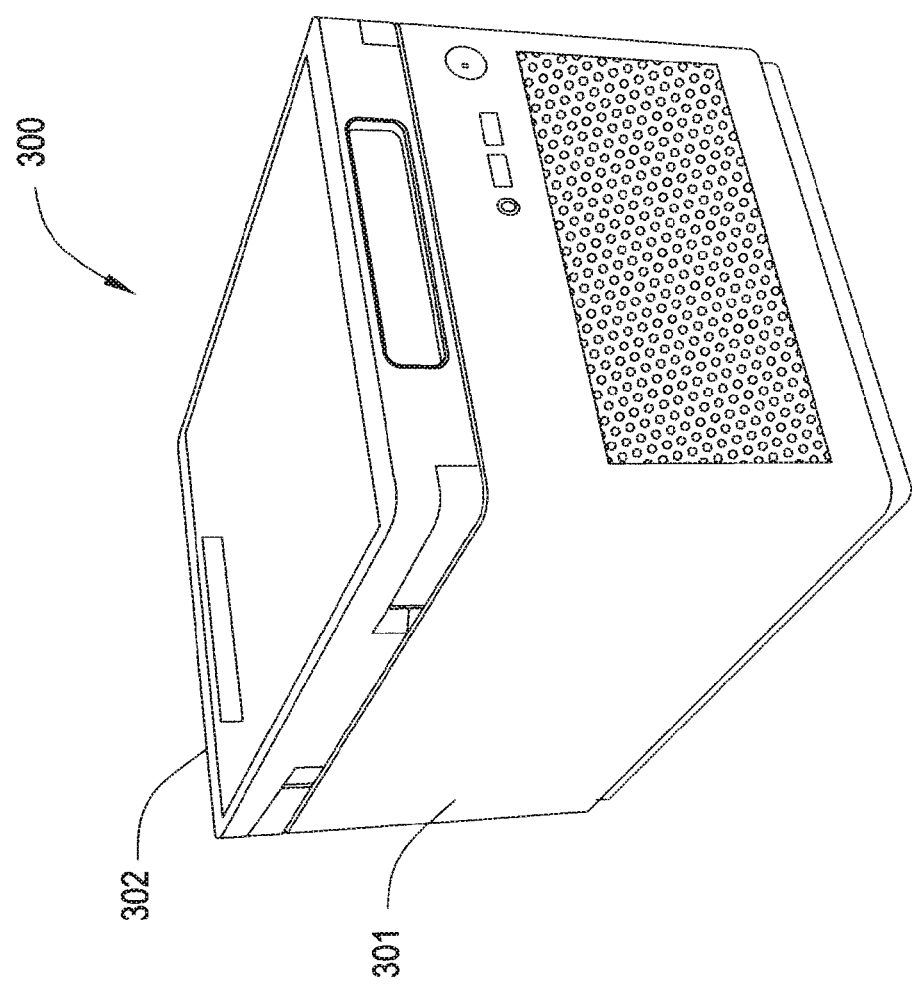
FIG. 3 illustrates an example vertical modular computing device.

FIG. 3 illustrates an example modular computing device 300 having the modules coupled together. The system may include a base module housing 301, having a top, a bottom, and at least one lateral edge forming a top side, a bottom side, and at least one lateral side. For example, as shown in FIG. 3, the modular computing device may be in the form of a rectangular structure. However, the modular computing device may also be formed into other shapes, for example, circular, triangular, square, and the like. The system may also include a cap module housing 302, having a top, a bottom, at least one lateral edge forming a top side, a bottom side, and at least one lateral side. The modules may be made using a variety of materials, for example, aluminum, plastic, another type of metal, a combination of materials, and the like. The modules may also include vents for air circulation.

Figure 4:
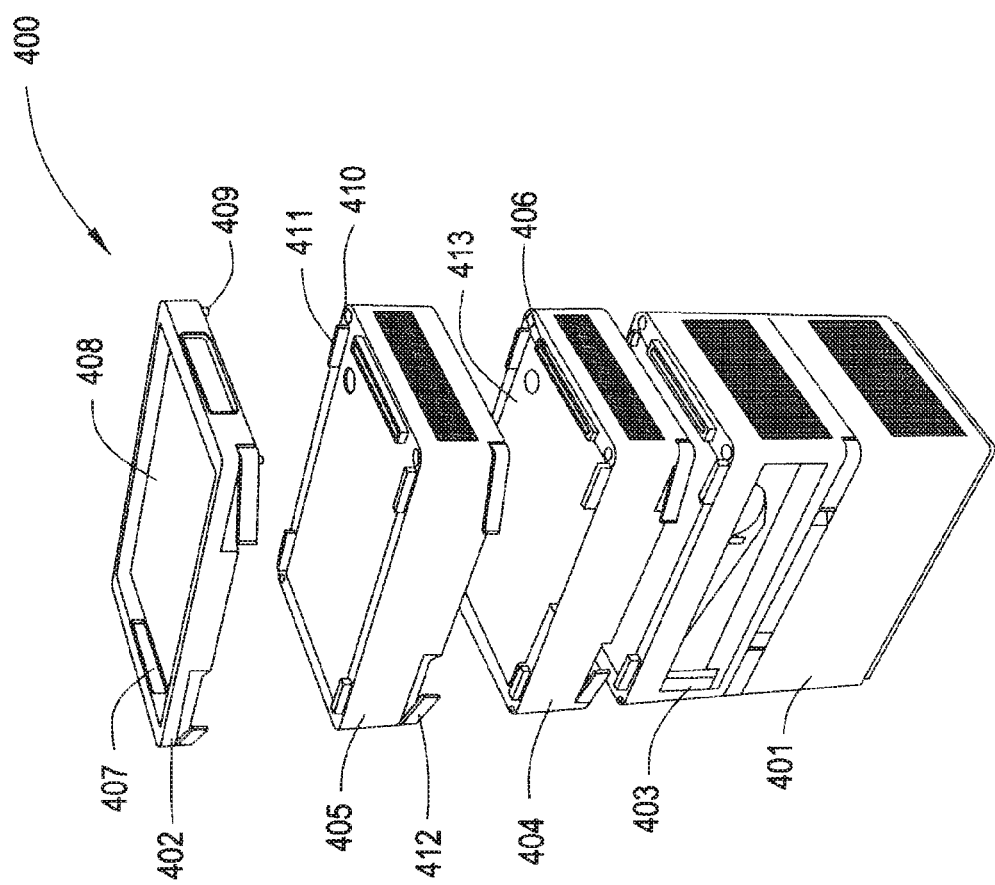
FIG. 4 illustrates an example vertical modular computing device with additional modules.

FIG. 4 illustrates an example module computing device 400 with modules separate from each other. The base module 401 is located at the bottom of the vertical modular stack. The cap module 402 is located at the top of the vertical module stack. The cap module 402 may include at least one indentation for carrying. For example, referring to FIG. 4, the cap module 402 may include openings 407 in the front side and back side of the module for carrying the modular computing device. The indentations or carrying handles may be openings (as shown), but also may only be recesses in the side of the module. The cap module 402 may also include an energy transfer device 408 on the top side of the cap module 402. As an example, the cap module 402 may include a wireless charging mat, which allows a user to place another electronic device on top of the modular computing device for charging. The energy transfer device may also include a device for wirelessly transferring data between another information handling device and the modular computing device.

Each module may include at least one connector 406 for facilitating electrical connections between each of the modules. For example, the connector 406 may be used to facilitate power and/or data transfer between modules. Non-exhaustive example types of connectors include USB connectors, PCI connectors, blade/socket connectors, plug/jack connectors, and the like. The connector 406 may be located at the top side of the module. A single connector is shown in FIG. 4, but it should be understood that more than one connector can be used rather than a single connector. The connectors may also be located in different locations. For example, the connector 406 may be located at the back of the top of the module. As another example, the module may have two connectors, one located at the front of the top of the module (as shown) and one located at the back of the top or on the side of the top of the module. The modules may include a connector on either both the front and back side or both the left and right side. This may allow for the modules to be rotated by 180 degrees and will still communicate with the rest of the modular computing device.

The connector 406 may include a protrusion from the top side of the module. Depending on the type of connector, the protrusion may protect or include pins, sockets, blades, jacks, plugs, and the like, of the connector. As an alternative, the connector 406 may include a recess, including the appropriate pins, sockets, blades, jacks, plugs, and the like. The cap module 402 may not include a connector 406 on the top side of the module because the cap module 402 is intended to be the top of the vertical stack and no other modules will be connected to the top of the cap module 402.

The modules may also include a connector on the bottom side of the module, which may be the corresponding connector mate for the connector 406 located on the top side of the module. This connector may be in a corresponding location on the bottom side of the module to mate to the connector 406 located on the top side of a module. For example, the cap module 402, may include a connector on the bottom side for mating to the connector 406 on the base module 401 or another module below it. Alternatively, the cap module 402 may only have a recess for accepting the connector 406 of the module below it. For example, the cap module may not need any electrical connections and may therefore not include a mating connector, but may rather include a recess for accepting the connector located on the module below the cap module within the stack. In the case of more than one connector 406 on the top side of the module, more than one connector or recess may be included on the bottom side of the module.

The base module 401 may not include a connector 406 on the bottom of the module, because the base module 401 is intended to be the bottom of the vertical stack and no other modules will be connected to the bottom of the base module 401. However, additional modules (e.g., 403, 404, and 405), which may be included in the module computing device stack, may include a connector 406 on both the top side of the module and a recess or connector on the bottom side of the module. Thus, when the modules are connected together the connector 406 will create a contact and facilitate electrical connections (e.g., power transfer, data transfer, etc.) between or through the modules.

While each module may include the same connections for transferring data and/or power between modules, each module may not use every connection. In other words, each module may have the same connector and mate to ensure that the modules can be stacked in multiple configurations, but each module may not need or use every connection. As an example, the connector may include a connection for video data. This video data connection may be included in the connector from the base module through the graphics module, through the storage module, through the peripheral device module, and so on. However, the storage module may not use the data included in the video data connection. In other words, some connections included in the connector for the module may act as a pass-through to another module and may not be accessed or used by every module.

In one embodiment, the modules may include protrusions 409 on the bottom of the module and recesses 410 at the top of the modules. These protrusions and recesses may assist in aligning the modules and ensuring that connectors are aligned between the modules. The protrusions on the bottom of the module may act as feet for the module. For example, when the module is removed and placed on another surface the protrusions may be the only part of the module that touches the other surface. This may help in protecting the bottom of the module from becoming scratched, dirty, parts from being damaged, and the like. The length of the protrusions may be dependent on the connector size. For example, if the protruding part of the connector is on the bottom of the module, the feet protrusions may be longer than the connector protrusion to ensure that the connector does not touch another surface. The protrusions and recesses may also be reversed. In other words, the bottom of the module may include the recesses and the top of the module may include the protrusions. The number and location of the protrusions and recesses may vary.

Once the modules are aligned and the connectors are connected, the modules may be coupled together using a latch mechanism. At least a portion of the latch mechanism may be on the top side of a module. Additionally, at least a portion of the latch mechanism may be on the bottom side of a module. In other words, the mating parts of the latch mechanism may be included on different modules in order to connect the two modules. The latch mechanism may be of different types and configurations. However, the latch mechanism should be of a type that latches or locks all the modules together when engaged. For example, when the modules are coupled, the user can pick up the modular computing device by a single module, for example, by the carrying handles included in the cap module, and the entire system will remain intact.

In one embodiment, the latch mechanism may include a receiver and an attachment element. This type of latch mechanism is shown in FIG. 4. The receiver 411 is located at the top of a module. The attachment mechanism 412 is located at the bottom side of the module. As shown in FIG. 4, the attachment mechanism is not necessarily located on the bottom side of the module, but rather at or towards the bottom side of the module. The receiver 411 may include a tab. The receiver 411 may also be shaped to catch the attachment mechanism 412. For example, the receiver 411 may be shaped like an upside-down L. Other shapes are possible and contemplated.

The attachment mechanism 412 may be attached to the module in a way that allows the attachment mechanism 412 to rotate away from the module. For example, the attachment mechanism may include a sleeve that is attached to a pin of the module. The sleeve can then rotate about the pin. In other words, the attachment mechanism 412 may rotate about an axis of rotation. When operated the attachment mechanism 412 may move perpendicularly to one of the lateral edges of the module housing. When the latch mechanism (e.g., 411 and 412) is engaged, the attachment mechanism 412 may catch the receiver 411. For example, the attachment mechanism 412 may include a lip that catches under the receiver 411. Thus, when the attachment mechanism 412 is engaged with the receiver 411, the modules are coupled together in such a way that prevents the modules from coming apart when they are lifted.

In the example of FIG. 4, the module may also include a recess for the attachment mechanism 412. Thus, when the attachment mechanism 412 is "closed" or engaged, the attachment mechanism sits flush with the module. To release the attachment mechanism 412, the recess for the attachment mechanism has an empty portion (not filled by the attachment mechanism 412) for the user to pull the attachment mechanism 412 out. As shown in FIG. 4, the recesses and protrusions, as discussed above, may be incorporated into the latch mechanism.

In one embodiment, the latch mechanism may include a tab portion and receiving portion for the tab portion. For example, the bottom side of a module may include a tab portion and the top side of a module may include a receiving portion for the tab portion. The tab module may be inserted or slid into the receiving portion. A portion of the tab may then set into the receiving portion to become slidably engaged with the receiving portion. As an example, this type of latch mechanism may be similar to a side-release or front-release buckle.

The modules may include a removable cover 413 which allows access to the inside of the module. The removable cover 413 may allow a user to replace components within the module, perform maintenance, or otherwise access the interior of the module. In addition to the base module 401 and the cap module 402, the modular computing device may include additional modules (e.g., 403, 404, and 405). The additional modules may be used to change the configuration of the modular computing device. In other words, the additional modules may be used by a user in place of upgrading components within a workstation as would conventionally be done. Each module may also include fans for air circulation and cooling. Alternatively, the base module 401 may include a fan for air circulation and cooling which may be circulated through all of the attached modules. For example, the modules may include vents on the top side and the bottom side which allow for air circulation and cooling throughout the entire modular computing device.

The additional modules (e.g., 403, 404, and 405) may include components that allow for upgrading or reconfiguring the modular workstation. For example, some modules may include additional hard drive space, removable media components, a replacement graphics card, and the like. The modules may also include components which are required for operating the desired module. For example, a battery backup module may include circuitry for initiating the battery backup. While a module may be preconfigured with the desired components, a module may also be configurable by the user. For example, the graphics module may include connection ports for graphics cards, rather than also including the graphics card. This allows the user to buy any graphics card and use it with the system. The modular computing device allows a user to add additional modules for configuring the modular device. Example types of additional modules include a battery backup module 404, a storage module 405, a graphics module 403, a peripheral device module, a display device module, a removable media drive module, and the like. These additional modules provide the user with additional components that a user may need. For example, the storage module may include more than one hard disc drive that increases the amount of storage space the base module provides.

The additional modules may be included in the modular computing device in any order. In other words, the modules do not need to be included in a particular order. For example, the storage module 405 may be included on top of the base module 401, rather than on top of the battery backup module 404. Some modules may perform more optimally in different positions. For example, the graphics module 403 may perform better when coupled as close to the base module 401 as possible. However, such ordering is not a requirement. Thus, the user can configure the modular computing device in such a way that is convenient to the user.

An example of an additional module includes a peripheral device module. This module may allow a user to use peripheral devices with the modular computing device. For example, the peripheral device module may include one or more connection ports for a printer, scanner, display device, information handling device, and the like. As an example, the peripheral device module may include connection ports and/or a stand for a tablet or a display panel. In this example, a user could then use the tablet device as a monitor for the modular computing device. Alternatively, the peripheral device module may allow the tablet to sync to the modular computing device. The peripheral device module may also allow connection of additional mechanical components. For example, the peripheral device module may allow for connection of a monitor mounting arm, connection mechanism, or stand for a display device.

Figure 5:
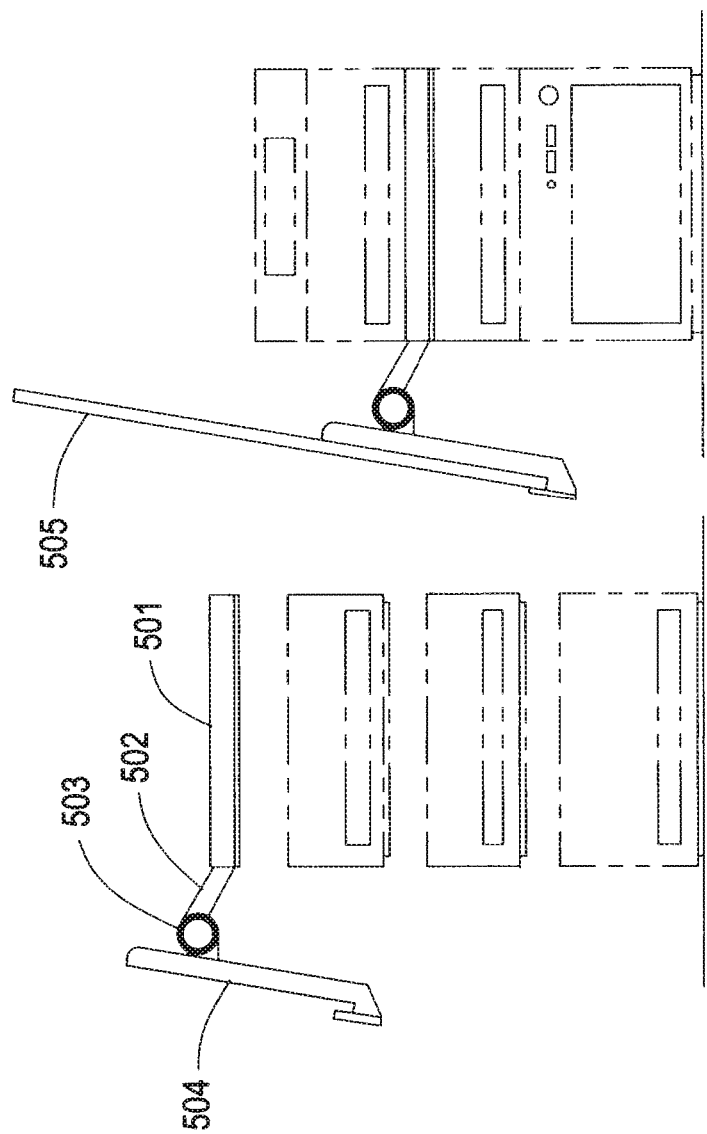
FIG. 5 illustrates an example modular computing device with a display device module.

An example of a peripheral device module is a display device module as shown in FIG. 5. The display device module 501 may be included within the modular computing device stack at a location convenient for the user. If the modular computing device allows for connection of a module in multiple directions, for example, a connector is included at both the front and the back of the module, the display device module 501 may be installed within the modular computing device stack in a manner that ensures the display device will be located on the side of modular computing device that the user desires. For example, the user can arrange the display device module 501 to ensure that the display device will be on the right side of the modular computing device.

The display device module 501 may include a display device element on a lateral side of the module housing. The display device element may allow for connection of a display device. For example, the display device element may include connection ports and a mounting mechanism for a display device. The display device module 501 may also include a display device element on more than one of the lateral sides or in more than one position of a lateral side of the module housing. For example, the display device module 501 may be used by a user to mount a monitor on two sides or edges of the modular computing device. As another example, the user may be able to mount more than one display on the same edge or side of the modular computing device. In one embodiment, the display device element may include a display mounting interface. As an example, the display device element may include a VESA mounting plate.

In one embodiment, the display device element may include a display device arm 502. The display device arm 502 may house electrical connections for facilitating power and/or data transfer between the display device and modular computing device. The display device arm 502 may also include at least one pivot element 503 that rotates about an axis of rotation. The pivot element 503 may allow for tilt adjustment of the display device 505. Additional or alternative pivot elements 503 may allow for side-to-side rotation of the monitor, extension of the display arm, and the like.

The pivot element 503 may be different types of pivot joints. For example, the pivot element 503 may include a ball and socket joint, hinge joint, pivot joint, and the like. Additionally, the pivot element 503 may be of different mechanical types. One type of pivot element 503 may be a friction based pivot element. In such a pivot element, the user may be able to adjust the display without having to perform additional steps. Friction would prevent the pivot element from moving under the weight of the display device, but would allow movement of the display by the user. Another type of pivot element 503 may be a mechanical pivot element (e.g., a cog type element, cam element, etc.) or a pressure-based pivot element. Using such a pivot element 503 may require a user to perform additional actions to move the display device. For example, a user may have to release a lever allowing the pivot element 503 to move freely.

Figure 6:
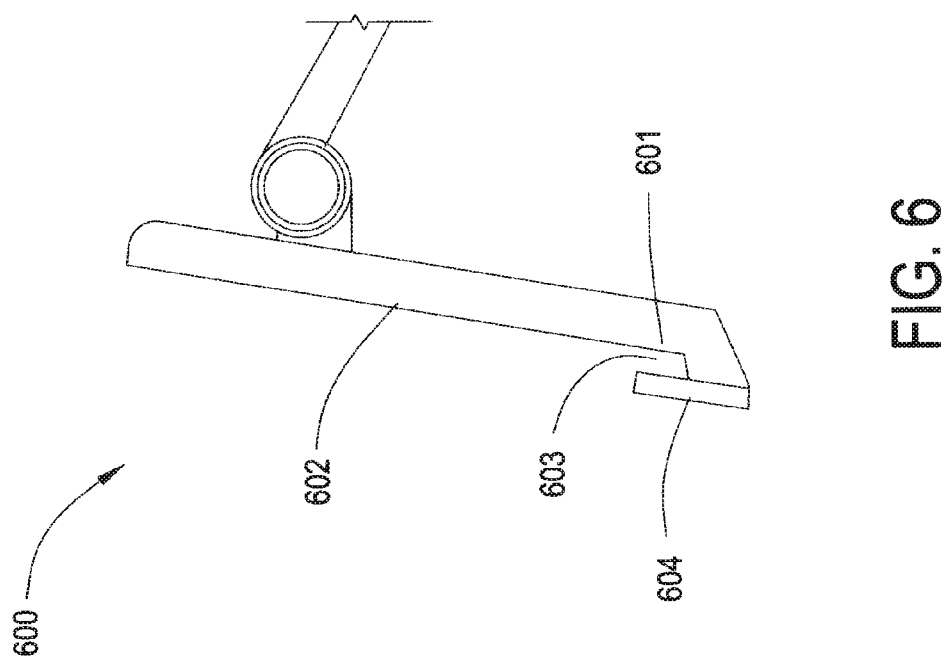
FIG. 6 illustrates an example display dock system.
Figure 7:
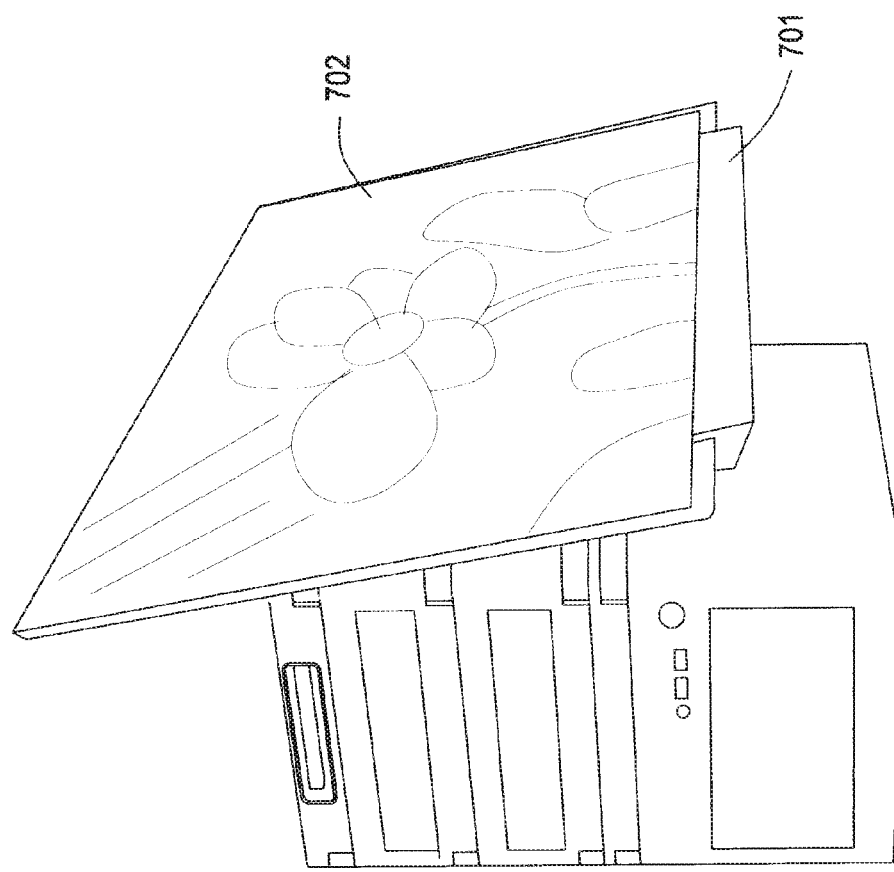
FIG. 7 illustrates an example modular computing device with a display device module and display device.

The display device element may also include a display device dock 504. This display device dock 504 may be used for connecting to a display device. As shown in FIG. 6, the dock 600 may comprise a ledge 601 running lengthwise along the dock and may be open at both ends. The dock may also have a back plate 602, a bottom 603, and a front lip 604 which may run the length of the dock. For example, the dock 701 may include a ledge for placing a display device 702, for example, as shown in FIG. 7.

Figure 8:
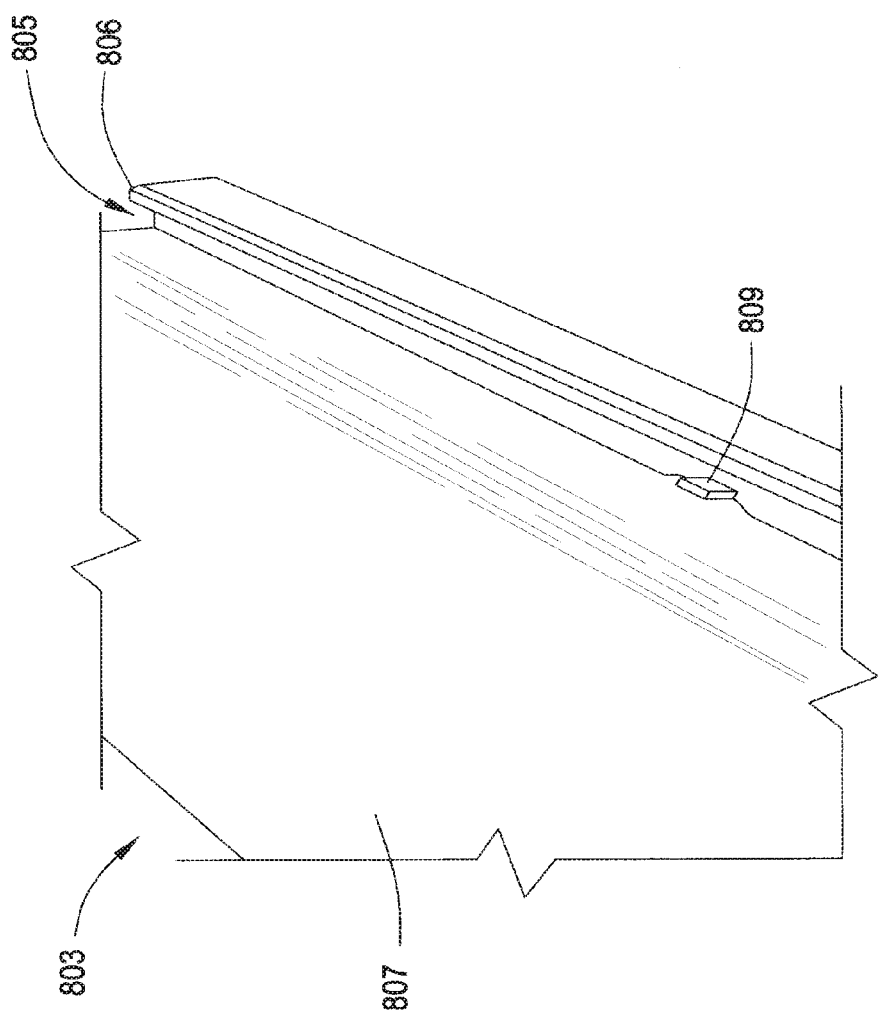
FIG. 8 illustrates an example display dock system.

The dock may also include a connection port or pins for communication with the display device. Referring to FIG. 8, which illustrates a perspective view of the front of the dock 803, the dock 803 may include a male connector 809 to which the mount accessory (not illustrated in FIG. 8) attaches. The male connector 809 may be placed or disposed in a ledge 805 of the dock 803, as illustrated. The spacing between the front lip 806 of the ledge 805 and the back plate 807 of the dock 803 may be sized appropriately to accommodate insertion of the mounting accessory, a display panel, or both. The male connector of the dock 809 may include power pins and data pins to communicate power to and data to and from the display panel(s), either connected directly to the dock 803 via male connector 809, or as connected to the mounting accessory and thus to the dock 803, as further described herein.

Figure 10B:
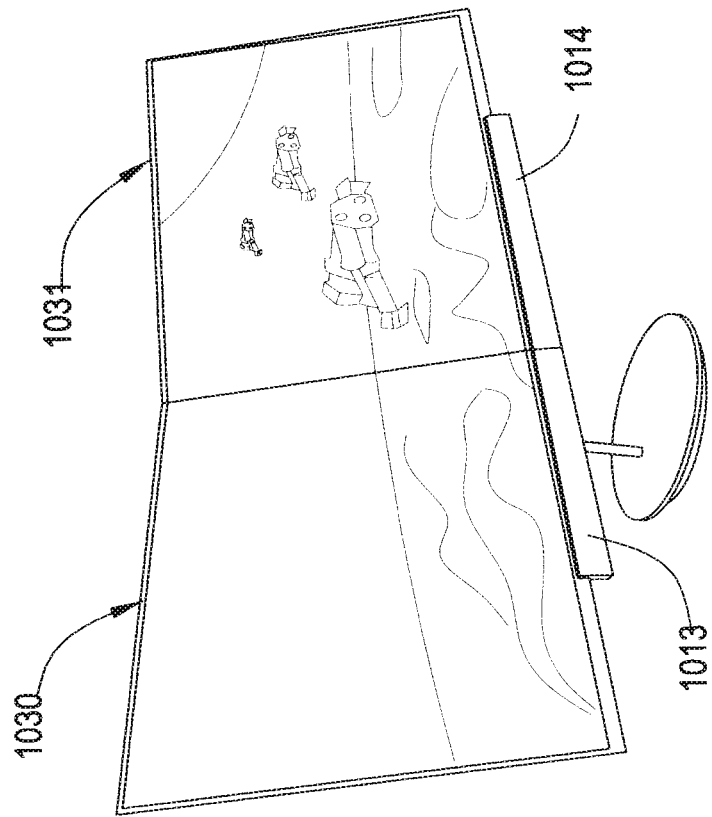
FIG. 10(A-B) illustrates an example system including a dock, mount accessory, and display panels.
Figure 10A:
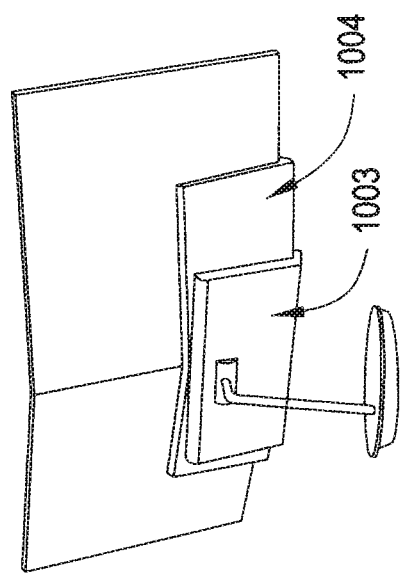

The display device dock may also allow for connection of more than one display device. In other words, the display device dock may be wider and have additional connection ports to allow for connection of more than one display. Alternatively, the display device element may comprise more than one display dock, which allows for connection of multiple display devices, for example, as shown in FIG. 9. The multiple display panels may also connect to the dock via a mount accessory as shown in FIG. 10A. The mount accessory 1004 includes power and data connectors for both the dock 1003 and the display panels 1030, 1031, as discussed above. As illustrated in FIG. 10B, the mount accessory 1004 supports display panels 1030, 1031 by inclusion of ledges 1013, 1014, similar to an easel supporting canvases. The long edges may include audio speakers for output of audio data, alone or in connection with display of video data on the display panel(s).

Figure 11:
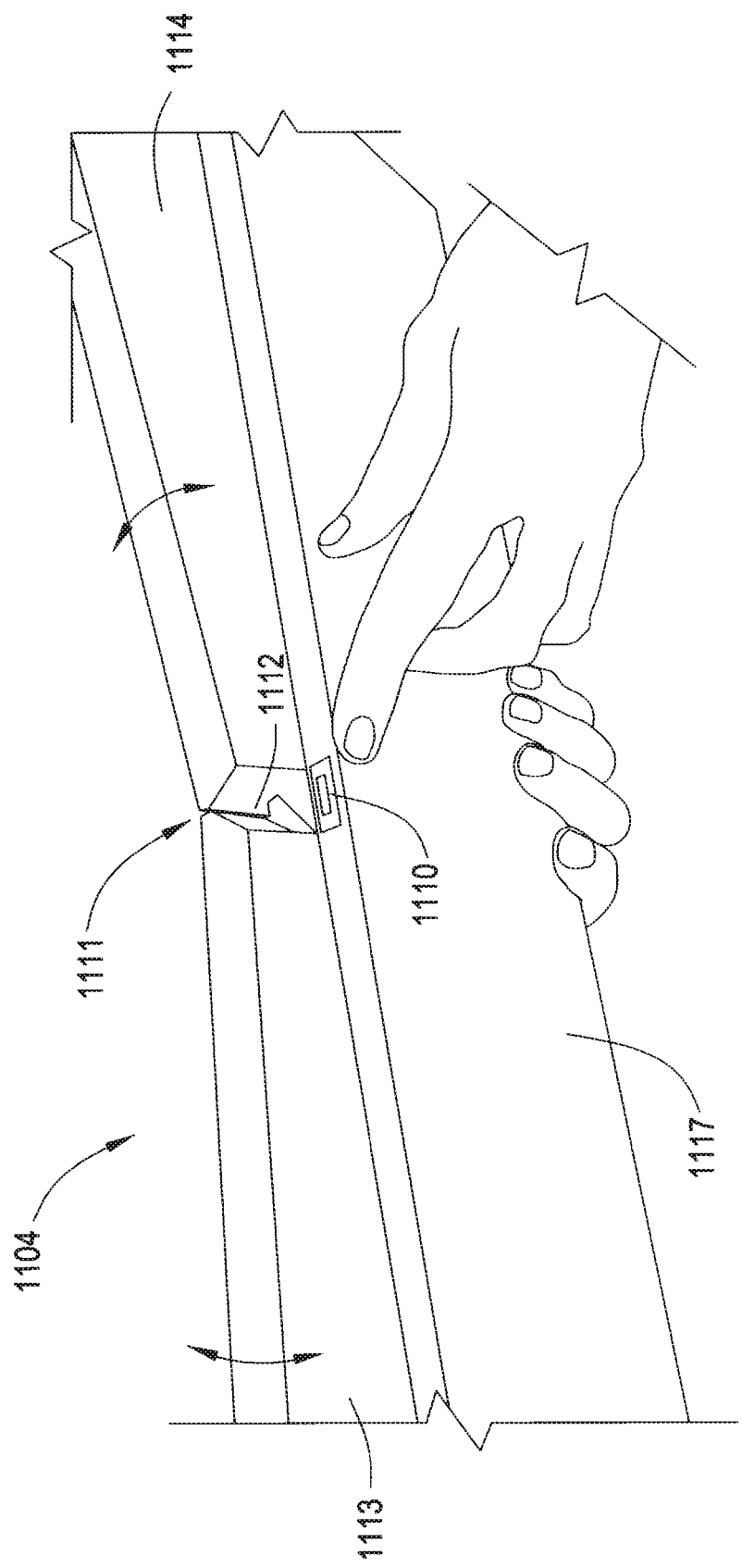
FIG. 11. illustrates an underside of an example mount accessory.

As shown in FIG. 11, the underside of a mount accessory 1104 includes a centrally located female port 1110 disposed in a central area 1111. This female connector or port 1110 attaches to the male connector of the dock. A central area 1111 of the mount accessory 1104 comprises a centrally located hinge 1112, partially visible from in the view of FIG. 11. Two long edges 1113, 1114 are hingedly attached to the centrally located hinge 1112 and extend from the central area 1111. Each of the two long edges 1113, 1114 move about the centrally located hinge 1112 such that they may be repositioned out (fore) and back (aft) with respect to the back plate 1117 of the mount accessory 1104.

Figure 12:
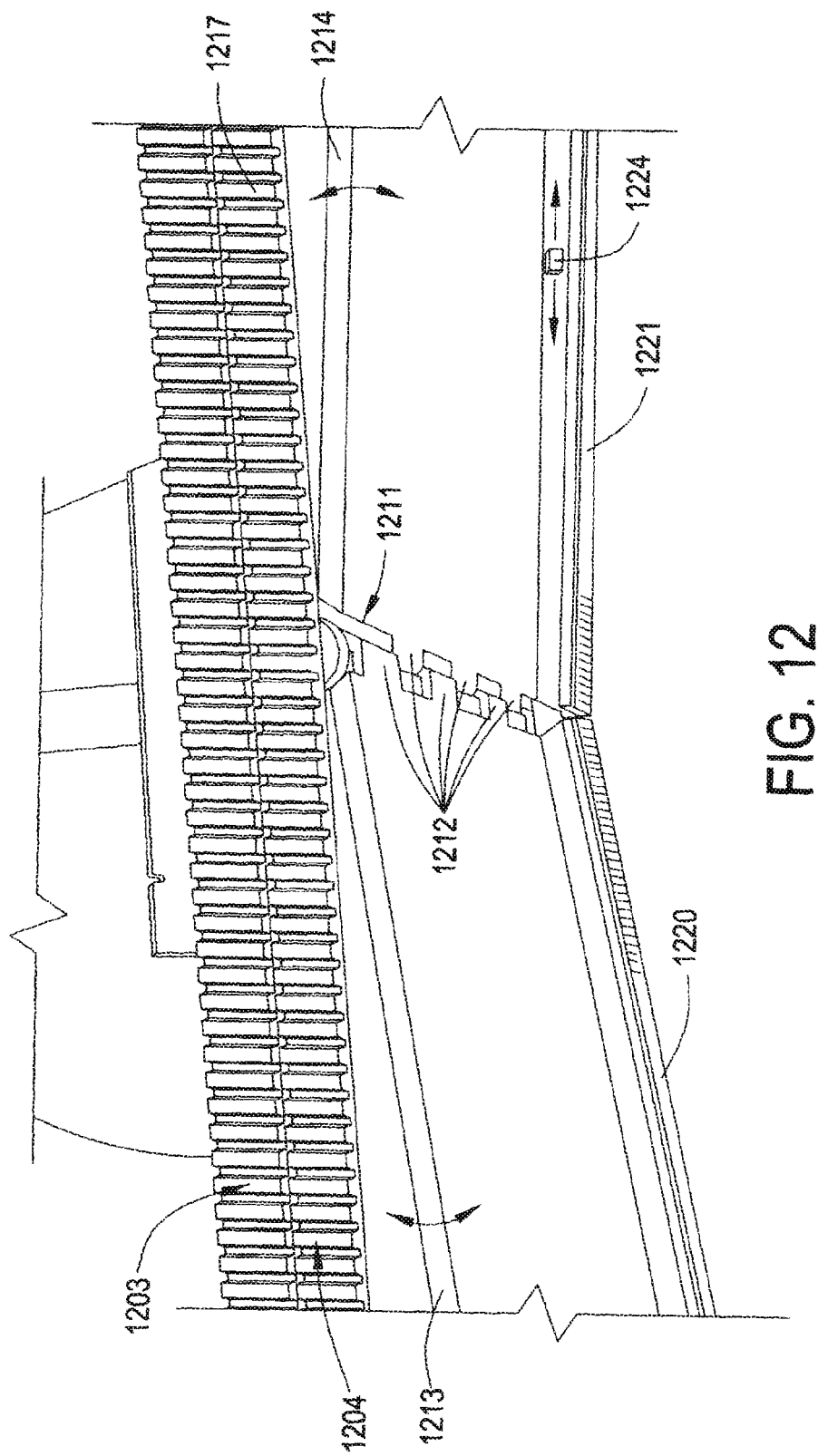
FIG. 12 illustrates an example top view of a mount accessory situated in a dock.

In FIG. 12 a top view illustrates the mount accessory 1204 seated into the dock 1203. The arm of the stand 1201 can be seen attached to a rear surface of the dock 1203. The front of the mount accessory 1204 includes a back plate 1217 that abuts the back plate of the dock 1204. The two long edges 1213, 1214 are hingedly connected via central hinge 1212 in central area 1211. The two long edges 1213, 1214 may pivot about the central hinge 1212 to more fore and aft, as illustrated by the arrows of FIG. 12.

The two long edges 1213, 1214 further comprise ledges 1220, 1221. Each of the two ledges comprises a male connector, one of which is illustrated at 1224, disposed therein. The male connector 1224 of ledge 1221 may be the same as male connector 809 of the dock 803. The male connector 1224 of the ledge 1221 may move laterally or along a long axis of the long edge 1214, as indicated by the arrows in FIG. 12 surrounding male connector 1224.

The various embodiments described herein thus represent a technical improvement to current computing systems. Using the techniques described herein, a user can purchase a base module and add additional modules to configure the computing device in a way that is most useful for the user. Additionally, even when adding the modules, the modular computing device footprint remains the same and requires no additional footprint space from the user. The configurability of the modular computing device also allows a user to configure the device based upon needs. For example, if a user needs one configuration one day and a different one the next day, the modular computing device can easily be changed and configured with little effort from the user. Thus, using the systems and devices described herein, the user can be assured of a configurable computing device that can be configured for any need the user may have while maintaining a small footprint.

As used herein, the singular "a" and "an" may be construed as including the plural "one or more" unless clearly indicated otherwise. Moreover, the connectors described herein may be any type. It is specifically noted that the use of "male" or "female" connector in the description and claims is to be interpreted broadly, i.e., a "male" connector may be replaced by a "female" connector, and vice versa, so long as an operative, physical connection is achieved.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system, comprising:
a module housing comprising a top, a bottom, and at least one lateral edge comprising a top side, a bottom side, and at least one lateral side;
at least one display device element disposed at a lateral side of the module housing; and
at least one display device operatively coupled to the at least one display device element;
wherein the module housing is connectable to another module housing using at least one latch mechanism, wherein the at least one latch mechanism when operated locks the module housing to the another module housing;
wherein at least a portion of the latch mechanism is disposed at the bottom side of the module housing; and
wherein at least another portion of the latch mechanism is disposed at the top side of the module housing.

2. The system of claim 1, wherein the at least one display device element comprises a display device arm.

3. The system of claim 2, wherein the display device arm comprises at least one pivot element that rotates about an axis of rotation.

4. The system of claim 2, wherein the display device arm houses electrical connections for facilitating data and power transfer.

5. The system of claim 1, wherein the at least one display device element comprises a display device dock operatively coupled to the display device.

6. The system of claim 5, wherein the display device dock comprises a display device dock for more than one display device.

7. The system of claim 1, wherein the at least one display device element comprises more than one display device dock.

8. The system of claim 7, wherein the more than one display device dock are operatively coupled together using a hinge.

9. The system of claim 1, wherein the display device element comprises a display device mounting interface operatively coupled to the display device.

10. A device, comprising:
a module housing comprising a top, a bottom, and at least one lateral edge comprising a top side, a bottom side, and at least one lateral side; and
at least one peripheral device element disposed at a lateral side of the module housing;
wherein the module housing is connectable to another module housing using at least one latch mechanism, wherein the at least one latch mechanism when operated locks the module housing to the another module housing;
wherein at least a portion of the latch mechanism is disposed at the bottom side of the module housing; and
wherein at least another portion of the latch mechanism is disposed at the top side of the module housing.

11. The device of claim 10, wherein the at least one peripheral device element comprises a display device arm.

12. The device of claim 11, wherein the display device arm comprises at least one pivot element that rotates about an axis of rotation.

13. The device of claim 11, wherein the display device arm houses electrical connections for facilitating data and power transfer.

14. The device of claim 10, wherein the peripheral device element comprises a display device mounting interface.

15. The device of claim 10, wherein the at least one peripheral device element further comprises a display device dock.

16. The device of claim 10, wherein the peripheral device element comprises a connector for a peripheral device.

17. The device of claim 16, wherein the connector for a peripheral device comprises a connector selected from the group consisting of: printer connector, universal serial bus connector, information handling device connector, and display device connector.

18. A system, comprising:
a base module housing comprising a top, a bottom, and at least one lateral edge comprising a top side and a bottom side, the base module housing comprising:
at least a portion of at least one latch mechanism disposed at the top side of the base module housing;
a display device module housing comprising a top, a bottom, and at least one lateral edge comprising a top side, a bottom side, and at least one lateral side, the display device module comprising:
at least a portion of at least one latch mechanism disposed at the top side of the display device module housing;
at least a portion of at least one latch mechanism disposed at the bottom side of the display device module housing; and
at least one display device element disposed at a lateral side of the display device module housing;
a cap module housing comprising a top, a bottom, and at least one lateral edge comprising a top side and a bottom side, the cap module housing comprising:
at least a portion of at least one latch mechanism disposed at the bottom side of the cap module housing;
wherein the base module housing, display device module housing, and cap module housing are vertically connectable using the latch mechanisms, wherein the latch mechanisms when operated locks the base module housing, display device module housing, and cap module housing together.

19. The system of claim 18, wherein the at least one display device element comprises a display device arm and further comprises a display device dock.

20. The system of claim 18, wherein the display device element comprises a display device mounting interface.

* * * * *